March 15, 1932.  J. J. MOJONNIER  1,849,148
FEEDER FOR CUPS AND THE LIKE
Filed Jan. 14, 1927   5 Sheets-Sheet 1

Inventor
Julius J. Mojonnier
By Thomas H. Ferguson
Attorney.

March 15, 1932. J. J. MOJONNIER 1,849,148
FEEDER FOR CUPS AND THE LIKE
Filed Jan. 14, 1927 5 Sheets-Sheet 4

Inventor
Julius J. Mojonnier
By Thomas H. Ferguson
Attorney

March 15, 1932.    J. J. MOJONNIER    1,849,148
FEEDER FOR CUPS AND THE LIKE
Filed Jan. 14, 1927    5 Sheets-Sheet 5

Inventor
Julius J. Mojonnier
By Thomas H. Ferguson
Attorney

Patented Mar. 15, 1932

1,849,148

UNITED STATES PATENT OFFICE

JULIUS J. MOJONNIER, OF OAK PARK, ILLINOIS, ASSIGNOR TO MOJONNIER BROS. CO., A CORPORATION OF ILLINOIS

FEEDER FOR CUPS AND THE LIKE

Application filed January 14, 1927. Serial No. 161,052.

The present invention relates to mechanism for feeding articles such as cups, containers, and the like. Usually these are arranged in a stack and fed one by one from the stack bottom. In case the feeding mechanism is associated with mechanism for filling containers, the fed containers are delivered to a conveyor which advances them step by step to the filling position. The invention, however, need not be limited to the handling of articles which are to be filled, but may be used for handling articles of a different character. Furthermore, certain parts may be used in one relation, and other parts in other relations.

In the present application I have shown the invention embodied in mechanism for feeding nested cups, or containers, one by one from the bottom of the stack and conveying them away to a filling mechanism where they are successively filled with some commodity such as ice cream.

Obviously, in other uses of the invention there may be occasion to feed the articles otherwise than singly, and they may in such cases be fed in sets of two, three, or more as desired.

My invention comprises several features. One of these consists of novel pneumatic means for seizing and conveying the cups or other articles from the stack to a delivery point. Such means may be employed to withdraw the bottom article from the stack where the articles are nested and stick together. On the other hand, if the articles do not stick together then the pneumatic means merely seizes and conveys the articles.

Viewed in another way, the invention comprises novel mechanism for feeding the articles seriatim from the bottom of the stack. Such mechanism may employ the pneumatic features in some instances and in others not.

Another feature of the invention consists in novel clamping means by which the stack is held and released during the feeding operations.

Another feature resides in the novel relation of the article guiding and conveying means to the article carrier upon which the articles delivered from the stack are distributed and held.

The pneumatic mechanism also includes certain novel features of suction control by which the articles are securely held during transmission and accurately delivered at the desired point.

The invention may be employed in several ways. Where the articles are freely fed from the holder by any of the well-known feeding devices now on the market, the pneumatic cup serves only to seize the article for safe transit and delivery. Where the cup with or without suction connections is used in cooperation with the novel stack-clamping members, the same constitutes one element of an escapement-mechanism for the feeding of the articles. Where, in the latter case, the articles stick together, then the suction connections must be employed to pull the lowermost articles away from the others held by the clamping members; but where they do not stick then the suction connections may or may not be used for conveying or guiding, as the designer may desire or circumstances dictate.

The various uses of the invention in its several parts will be readily seen when the following detailed description is read in connection with the accompanying drawings. The same consideration will also disclose more fully the several features and aspects of the invention. The scope of the invention will be more particularly set forth in the appended claims.

In said drawings.

In general, the machine illustrated in the drawings comprises a main hopper A for holding the supply of the commodity to be filled into the containers, a valve B by which the commodity is fed from the hopper to the charging cylinder or cylinders and then from the latter to the containers, C the cylinder block bored in the present instance for two cylinders, D the rotary conveyor which carries the containers to the filling position, E the feeder by which the containers are fed from a holder into openings or other retaining means on the carrier, and F the receiving table upon which the filled containers are delivered for subsequent removal by an attendant.

The general arrangement of the machine parts to which my new feeder is applied is the same as disclosed in the application of Mojonnier, Phillip and Clarke, Serial No. 129,700, filed August 17th, 1926, Patent No. 1,750,419, dated March 11, 1930.

Figure 5:
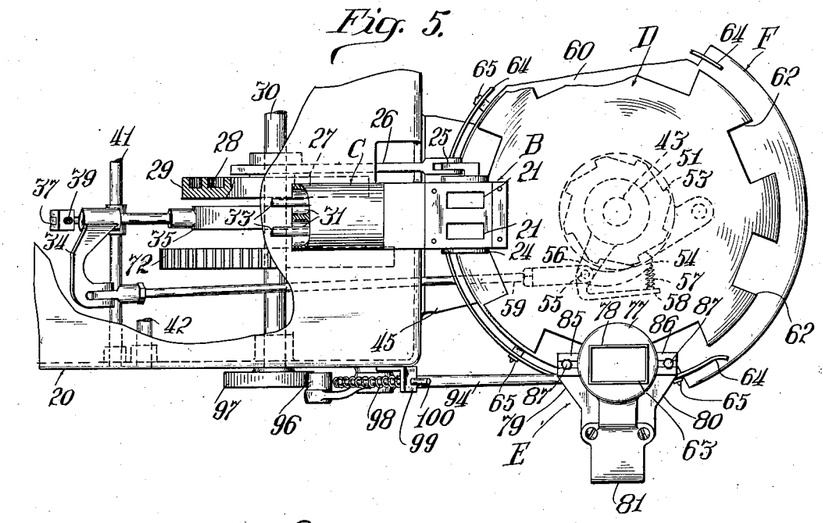
Fig. 5 is a plan view of the structure of Fig. 1 illustrating both the feeder and packaging machine parts.
Figures 6, 7:
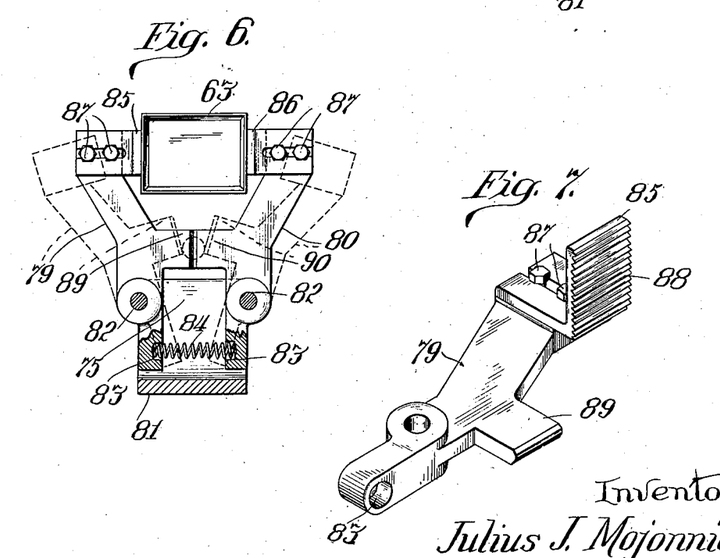
Fig. 6 is a horizontal sectional view illustrating particularly the feeder clamping members, the plane of section being indicated by the line 6—6 of Fig. 1.
Fig. 7 is a perspective view of one of the clamping members of Fig. 6.

Referring to the drawings in detail, it will be seen that the various parts, including those of the novel feeder, are positioned upon a main frame 20 of box-like structure which encloses the motor, gearing and other movable parts. The hopper A is located, as is usual in machines of this class, directly above the valve B. It may be of any preferred construction and need not be described in detail. It is constructed along the lines of United States Patent No. 1,502,314, dated July 22, 1924, and has a single partition so as to provide for two flavors of ice cream, if that be the commodity handled. This is indicated in Fig. 5 by the two outlets 21 through which the hopper contents pass on their way to the cylinders in the block C. There are corresponding openings in a block 22 which forms the bottom of the hopper A. This block is secured to the cylinder block C by any suitable means such as the screw bolts 23. Obviously, the openings in the block 22 register with the openings 21.

The valve B comprises a rotary member 24 which fits into a bore extending crosswise of the forward end of the cylinder block C. The member 24 is provided with suitable passages which cooperate with passages in the cylinder block to guide the material from the hopper A to the cylinders in one position of the valve, and from the cylinders to a discharge point directly beneath the valve in the alternate position of the valve. The arrangement is similar to that shown in the patent to Geyer No. 1,401,150, dated December 27, 1921, and also to that shown in applicant's prior application Serial No. 75,953, filed December 17, 1925. It therefore need not be more fully disclosed herein.

One end of the rotary valve member 24 is provided with a crank arm 25 which is connected at its outer end with an actuating rod 26 driven through the agency of a cam roller 27 and a cam track 28 upon a cam member 29 keyed to a cam shaft 30 journaled in the side walls of the main frame 20. The rod 26 is bifurcated at the cam end and the bifurcations straddle the shaft 30 and in this way the rod 26 is guided in its reciprocations.

The cylinder block C is bored to provide two cylindrical chambers 31. In each there is a piston 32 upon a piston rod 33. For the purpose of actuating the piston rods 33 there are link and lever connections between the rods and a driving head 34. The head 34 is provided with an eccentric band 35 and the latter encircles an eccentric 36 keyed to the cam shaft 30. As a result of this construction, the rotation of the eccentric 36 reciprocates the driving head 34. The movements of the latter are communicated to the piston rods 33 through bell crank levers 37 and 38 connected by a link 39. The outer ends of the piston rods 33 are slotted and the connection includes in each instance an adjusting screw 40 by which the stroke of the piston may be varied. The bell cranks 37 and 38 are respectively mounted on shafts 41 and 42 which are journaled in bearings in the side walls of the frame 20.

Each to and fro movement of the pistons corresponds to one rotation of the cam shaft 30. The same rotation causes the valve B to move through its cylinder filling and cylinder discharging positions. This means that as the pistons 32 recede, the valve B is in position to guide charges of the commodity from the hopper into the cylinders. The action of the pistons is to draw in charges of the commodity thus available. The return movement of the pistons to discharge the commodity from the cylinders occurs when the valve is in its discharge position.

The carrier D is mounted for rotation upon the upper end of a fixed shaft 43 which is firmly secured in a boss 44 in a bracket 45 which extends forward from the main frame 20 to which it is secured by any suitable means such as the machine screws 46. The shaft 43 is held in fixed position by means of a set screw 47. The carrier D is provided at its center with a hub 48 which is turned down so as to provide a peripheral groove for a brake band 49 which surrounds the hub in the groove and is fixed at its outer end to a post 50 which extends upward from the bracket 45 to which it is fixed. This brake construction places a drag upon the rotation of the carrier D and prevents its over-stepping, all as more fully disclosed in the aforesaid Patent No. 1,502,314, dated July 22, 1924. The lower face of the hub 48 rides upon a rocking member 51 and the latter engages a spacer 52 which lies between it and the boss 44 on the bracket 45. Like the hub 48, the rocking member 51 is free to rotate upon the shaft 43. If desired, the latter may be adjusted in elevation by the spacer 52, being elevated and lowered in the manner pointed out in the aforesaid application Serial No. 129,700, filed August 17th, 1926, Patent No. 1,750,419, dated March 11, 1930. Ratchet teeth 53 are located on a portion of the hub 48 beneath the brake band 49 and cooperate with a driving pawl 54 which is pivotally mounted upon a pin 55 at the outer end of an arm 56 of the rocking member 51. The free end of the pawl 54 is normally pressed into tooth engaging position by a spring 57 which bears between it and a fixed arm 58 carried by the arm 56 of the member 51. The pin 55 which carries the pawl 54 is secured to the forward end of an actuating rod 59 which is pivotally secured at its rear end to the reciprocating head 34. With this construction the reciprocations of the head 34 cause the driving pawl 54 to advance and recede once for each reciprocation, stepping the carrier D forward one step. This step by step mechanism for advancing the carrier is practically the same as that disclosed in the aforesaid Patent No. 1,502,314.

Figures 1, 2:
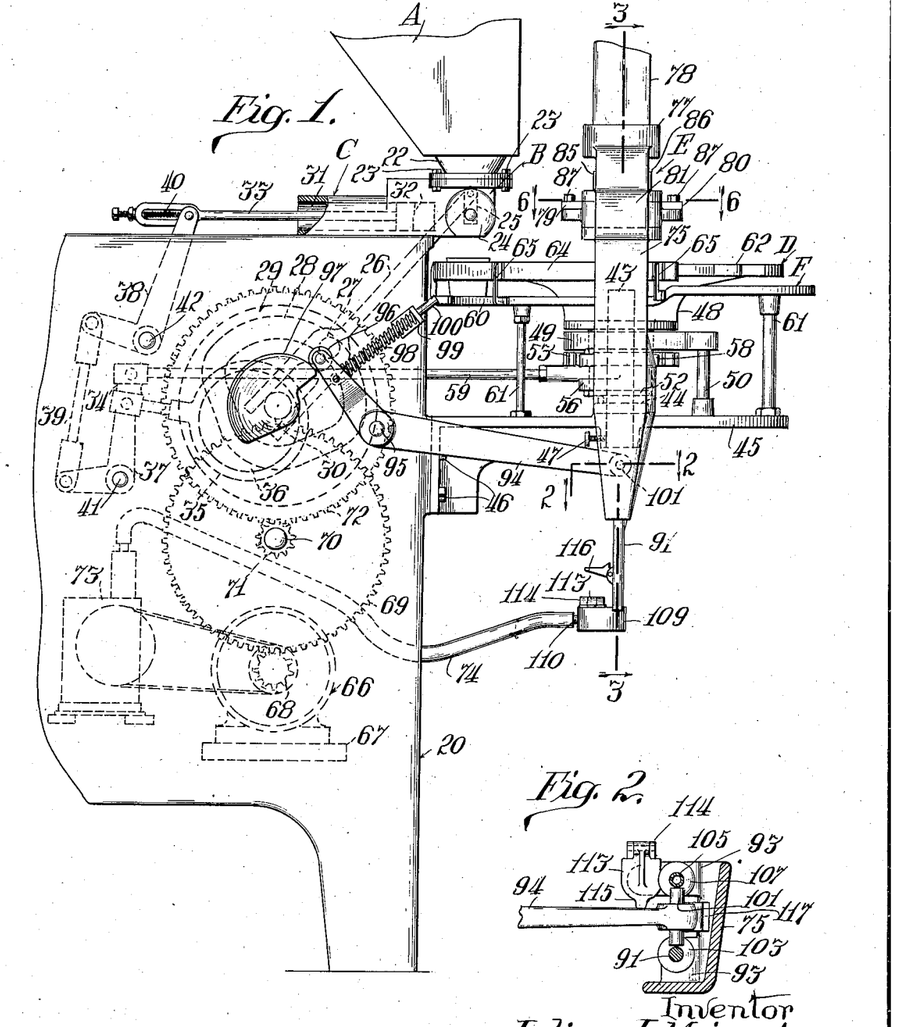
Fig. 1 is a side elevation of a feeder constructed and arranged in accordance with the present invention, shown in conjunction with the filling mechanism and other parts of a packaging machine.
Fig. 2 is a detail sectional view of a mechanical connection between parts of the feeder, the plane of section being indicated by the line 2—2 of Fig. 1.

Beneath the rotary carrier D is a peripheral plate 60 which is widened out at the forward side of the machine to form the table F. The plate 60 is supported at a plurality of points by legs or rods 61 which extend upward from the bracket 45. The outer edge of the carrier D is provided with a series of recesses 62. These are shaped so as to fit against the walls, or certain walls, of the containers that are to be used in the machine. These containers may be variously shaped. In the form of the invention now under consideration they are rectangular in section. These rectangular containers are designated generally by the numeral 63. Cooperating with the recesses 62 in the carrier D is a peripheral guard 64 which extends from a point just forward of the feeder E to a point near the opposite edge of the table F. The recesses 62 and the guard 64 serve to hold the containers 63 in proper position from the time they are delivered by the feeder E until they are discharged beyond the distant end of the guard upon the table F from which they are removed by an attendant. As clearly shown in Fig. 1, the plate 60 merges into the table F by an upward bend. The bottoms of the containers 63 slide along the plate 60 as they travel under the impetus of the carrier D. As the containers 63 pass up from the plate 60 to the table F at the point opposite the feeder E they are lifted with reference to the engaging walls of the recesses 62 and are thus freed for more ready removal outward upon the surface of the table F as the carrier continues its travel. The guard 64 is supported above the plate 60 by a series of posts 65.

The cam shaft 30 is connected by a train of gearing with a driving motor 66 suitably mounted upon a support 67 carried by the main frame 20. A pinion 68 on the motor shaft engages a gear wheel 69 which is mounted on a transverse shaft 70 having bearings in the side walls of the main frame 20. A pinion 71 movable with the gear wheel 69 engages a gear wheel 72 which is keyed directly to the cam shaft 30. By this gearing the speed of the motor 66 is properly reduced to that required for the cam shaft 30. In addition to driving the latter shaft, the motor 66 also drives a pump 73 suitably carried by the frame 20. This pump may be of any suitable construction and is intended to provide suction for the pneumatic cup of the feeder E. The suction connection is provided through a suitable flexible tube 74.

In the form of the invention illustrated the articles which are to be fed are containers. In the present instance these, as before noted, are rectangular in horizontal section. The material of these containers, as well as that of the other containers hereinafter mentioned, is usually paper waxed or otherwise treated for the purpose of being impervious to the moisture of the commodity, in case such commodity be a frozen dairy product, such as ice cream.

The construction heretofore described is in general the same as that disclosed in the aforesaid application Serial No. 129,700, filed August 17th, 1926, Patent No. 1,750,419, dated March 11, 1930. The disclosure of the same, however, is necessary as certain parts cooperate with the feeder which I have invented and which may now be described in detail. In certain aspects the invention includes combinations of the feeder mechanism and parts of the machine heretofore described.

The principal parts of the feeder E are carried by a bracket 75 which is suitably secured to the bracket 45 at the front of the machine. The brackets 75 and 45 are secured together by any suitable means such as the machine screws 76. As clearly shown in Fig. 5, the bracket 75 is located about 90 degrees from the valve B, measuring the parts with reference to the center of the carrier D. With this arrangement there is one position of rest for the container after leaving the feeder E before it reaches the filling position. This gives an opportunity to inspect the same and to adjust it or replace it by another, if that becomes necessary, before the filling position is reached. The bracket 75 carries at its upper end a ring 77 which embraces a tubular holder 78 near the lower end of the latter. The holder 78 is of a size and horizontal outline such as to hold a stack of nested containers 63. In the case in hand, the tube 78 is rectangular in cross-section. The containers are placed in the holder 78 with their closed ends downward, as clearly illustrated. The stack of containers 63 is normally held in its elevated position by a pair of clamping members 79, 80 which are in the form of levers pivoted at intermediate points to the projection 81 of the bracket 75. In each instance a pivot pin 82 is provided for this purpose. The rear ends of the levers 79 and 80 are hollowed out in each instance so as to provide hollow seats 83 for the seating of the opposite ends of a coiled compression spring 84. This spring tends to force the forward ends of the levers 79 and 80 together so as to bring their respective clamping jaws 85 and 86 into engagement with the walls of the containers of the stack. The jaws 85 and 86 are angular in shape. One leg of the angle is slotted for the passage of a plurality of screw bolts 87. These bolts are threaded into openings in the outer end of the associated lever 79, or 80, as the case may be. By loosening the bolts 87 in each case, the faces of the jaws 85 and 86 may be adjusted toward or from each other. The faces of the jaws 85 and 86 are roughened or grooved, as shown at 88, to more firmly engage the containers 63. The movement of the jaws 85 and 86 toward each other is limited by the engagement of the projections 89 and 90 on the levers 79 and 80 respectively. The jaws 85 and 86 are set so as to press with the requisite firmness against the containers 63 at the time the projections 89 and 90 engage each other. This arrangement also insures a firm engagement of the jaws with the container stack when the clamping members are in clamping position.

Figures 3, 4:
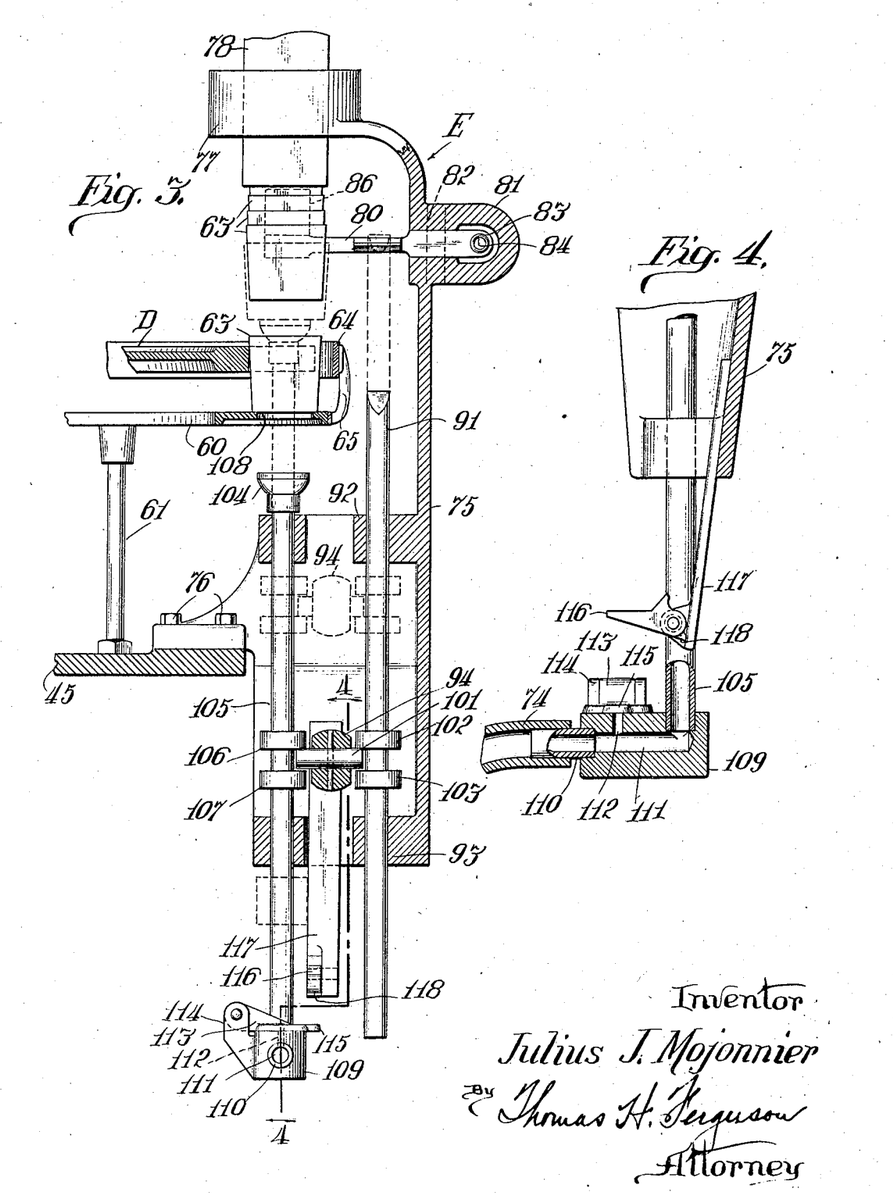
Fig. 3 is a vertical section through the principal feeder parts, the plane of section being indicated by the line 3—3 of Fig. 1.
Fig. 4 is a sectional view of a portion of the feeder illustrating the mechanism by which the suction of the pneumatic cup is controlled, the plane of section being indicated by the line 4—4 of Fig. 3.

In order to move the clamping members 79 and 80 out of engaging position, a vertically movable member in the form of a rod 91 is employed. This rod is beveled at its upper end so as to provide a wedge which is adapted to enter between the projections 89 and 90 and force them apart to open the clamping jaws 79 and 80. The member 91 travels through guide openings in webs 92 and 93 of the bracket 75. The member 91 is raised and lowered through the agency of a lever 94 pivoted at the point 95 to the main frame 20 and provided with a cam roller 96 which cooperates with a cam 97 on the cam shaft 30. A coiled compression spring 98 presses at one end against the lever 94 and at the other end against a fixed stop 99 carried by the frame 20. A rod 100 extends through the spring 98 and through an opening in the stop 99 and serves to hold the spring 98 from lateral distortion. The spring 98 yieldingly holds the cam roller 96 at all times in engagement with the cam 97. The forward end of the lever 94 carries a transverse pin 101 which passes at one end between collars 102 and 103 secured to the vertically movable member 91. With this construction it will be seen that for each rotation of the shaft there will be one rotation of the cam 97 with one up and down movement of the cam operating member 91. Because of the shape of the cam 97, the rod 91 will remain elevated during about half a revolution of the shaft 30 and during the balance of the revolution will be depressed. As noted later, this action will be in timed relation to the movements of the other parts so as to bring about suitable coaction. In Fig. 3 the elevated position of these parts is shown in dotted lines and the lower position in full lines.

It will be seen that when the clamping members 79 and 80 are spread apart by the rod 91, the stack of containers 63 will be free to drop by the action of gravity. In order to prevent their dropping too far, I employ an additional member 104. This member in the preferred embodiment of the invention is a pneumatic cup, although where the suction feature of the invention is not employed it may be a simple piece of metal or other material that will fit against the bottom of the particular container in hand. The cup 104, where the suction feature is employed, has its rim shaped so as to closely fit against the under side of the container or other article with which it comes in contact to provide therewith a suction chamber. The member 104 is carried at the upper end of a tubular rod 105. This rod of course may be a solid rod where the suction feature is not employed. This rod is guided by openings in the webs 92 and 93 of the bracket 75 in a manner similar to the clamp-actuating rod 91. Like the latter, it is provided with fixed collars 106 and 107 which engage opposite sides of one end of the transverse pin 101 carried by the lever 94. By reason of this construction, the elevation of the forward end of the lever carries both rods 91 and 105 upward. The former, as before noted, spreads the clamping members 79 and 80 apart and frees the stack so that it may fall. The latter is then in such position that the member 104 will limit the downward movement of the stack. In this way the retaining means provided by the clamping members 79 and 80 and the member 104, with their actuating connections, serve as an escapement for the delivery of containers one by one from the bottom of the stack. When the stack of containers 63 drops upon the member 104, it drops far enough to bring the lowermost container 63 below the effective clamping faces 88 of the jaws 85 and 86 of the clamping members 79 and 80. This means that the lowermost container 63 is then not under the control of the retaining members 79 and 80. If the containers 63 are so constructed that they do not stick together, then the lowermost container will fall of its own weight and thus separate itself from the containers within the grasp of the members 79 and 80. In such case the lowermost member would simply follow the member 104 in its downward movement and be delivered into the retaining space provided in the carrier D. It will be noted that the plate 60 is provided with a hole 108 directly beneath the holder 78, which is large enough for the passage of the member 104 on the rod 105. The opening 108 also lies directly beneath each carrier opening as it comes into position to receive a container from the holder 78. In other words, the advance movements of the carrier D take place while the rods 91 and 105 are in their lowermost positions and then while the carrier is at rest these rods rise, the one to separate the clamping members and the other to pass through the opening 108 and limit the downward movement of the stack. These timed actions take place by reason of the relations of the eccentric 36 and the cam 97 upon the cam shaft 30.

Where the suction feature of the invention is employed, the lower end of the tube 105 terminates in a coupling member 109, having a terminal connection or nipple 110. To the latter one end of the tube which extends from the vacuum pump 74 may be connected. The member 109 is apertured so as to provide a communicating passage 111 between the interior of the rod 105 and the interior of the tube 74. The passage 111 may be opened to atmosphere through a valve opening 112. The seat of the valve is provided by the upper side of the member 109. A valve 113 fits against the valve seat and normally closes the opening 112. The valve 113 is pivoted to a bracket 114 extending from one side of the member 109. The forward edge of the valve 113 is provided with a finger 115 which is used in momentarily opening the valve as the rod 105 reaches the critical point in its downward movement. Cooperating with the finger 115 is a trip finger 116 carried at the lower end of a downwardly extending support 117 secured at its upper end to a wall of the bracket 75. The finger 116 is pushed out of the way by the finger 115 on the valve as the latter moves upward, but upon the return movement of the valve the finger 116, by reason of its shoulder 118 engaging a fixed portion of the support 117, is not pushed out of the way but, instead, engages the finger 115 on the valve 113 and raises the latter to open the suction connection to atmosphere and thus destroy any suction that may exist in the cup 104. It will be seen that with this construction the pump 73 is operating at all times to draw air through the rod 105 and the tube 74. When the cup 104 is open the air thus drawn through the cup and tube performs no holding function. However, as soon as the cup 104 engages the bottom of the lowermost container 63, the suction in the chamber thus provided between the cup and the container seizes and holds the container and continues to do so until the valve 113 is opened whereupon the holding function is discontinued. In the normal operation, where the suction feature is employed, the valve 113 is opened at the time the lowermost container is fully delivered to the carrier D. This takes place when the bottom of the container reaches the plate 60. At this time, or just before it, the suction is removed from the cup 104. It will be seen that where the suction feature is employed the lowermost container 63 may be removed from the stack even though it sticks to the container above it, as is the case in certain types of containers, as they come in nested stacks from the manufactuer.

It will be seen that where the suction feature is not employed—and this may be readily accomplished at any time by merely disconnecting the tube 74 from the nipple 110—the speed of the mechanism may be such that the fall of the lowermost container 63 under the force of gravity will be retarded by the member 104. On the other hand, where the suction feature is employed, the downward movement of the lowermost container 63 may be greater than that which would result from the pull of gravity alone. This latter result is quite independent of whether or not the lowermost container sticks to the container above it and is pulled off by suction.

From what has been said, it will be seen that the feeder E delivers the containers 63 one by one into the recesses 62 in the carrier D and the latter conveys the containers successively to filling position beneath the valve B. During rest periods the containers are fed into the recesses, and during rest periods the containers are filled from the hopper.

After being filled the containers are advanced to the table F beyond the guard 64. Here they are removed by an attendant.

Figures 8, 9, 10:
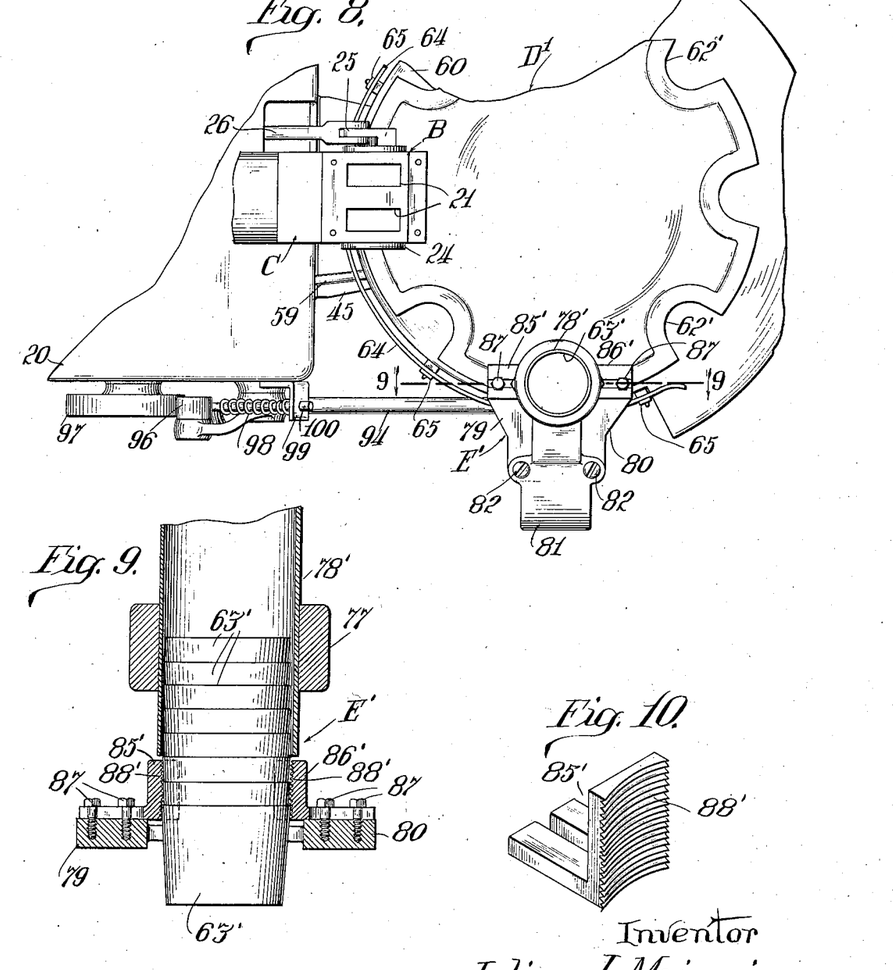
Fig. 8 is a plan view similar to Fig. 5 illustrating a modified carrier and feeder for dispensing cups of circular cross-section, instead of oblong cross-section as shown in the previous figures.
Fig. 9 is a vertical section through the feeder of this modified construction, the plane of section being indicated by the line 9—9 of Fig. 8.
Fig. 10 is a perspective view of one of the clamping jaws of this modified feeder construction.

Passing now to the consideration of the modifications, attention will first be called to the feeder $E^1$ shown in Figs. 8, 9 and 10. Here the feeder is the same as heretofore described except that the jaws $85^1$ and $86^1$ have curved container-engaging surfaces $88^1$, as shown more particularly in Fig. 10. This is for the purpose of fitting containers $63^1$ which are circular in cross-section and not provided with outwardly extending flanges or rims. In this case, as before, the descent of the stack of containers must be such as to leave the bottom container clear of the jaws $85^1$ and $86^1$ at the time it is engaged by the cup member 104. In this instance the carrier $D^1$ also differs from the carrier D in having the recesses $62^1$ curved instead of angular. This change is necessary in order to provide a fit for the curved walls of the circular containers $63^1$. In this case the containers are held in place by the walls of the recesses $62^1$ and the associated guard 64. The holder $78^1$ is necessarily circular in section.

Figures 11, 12, 13, 14:
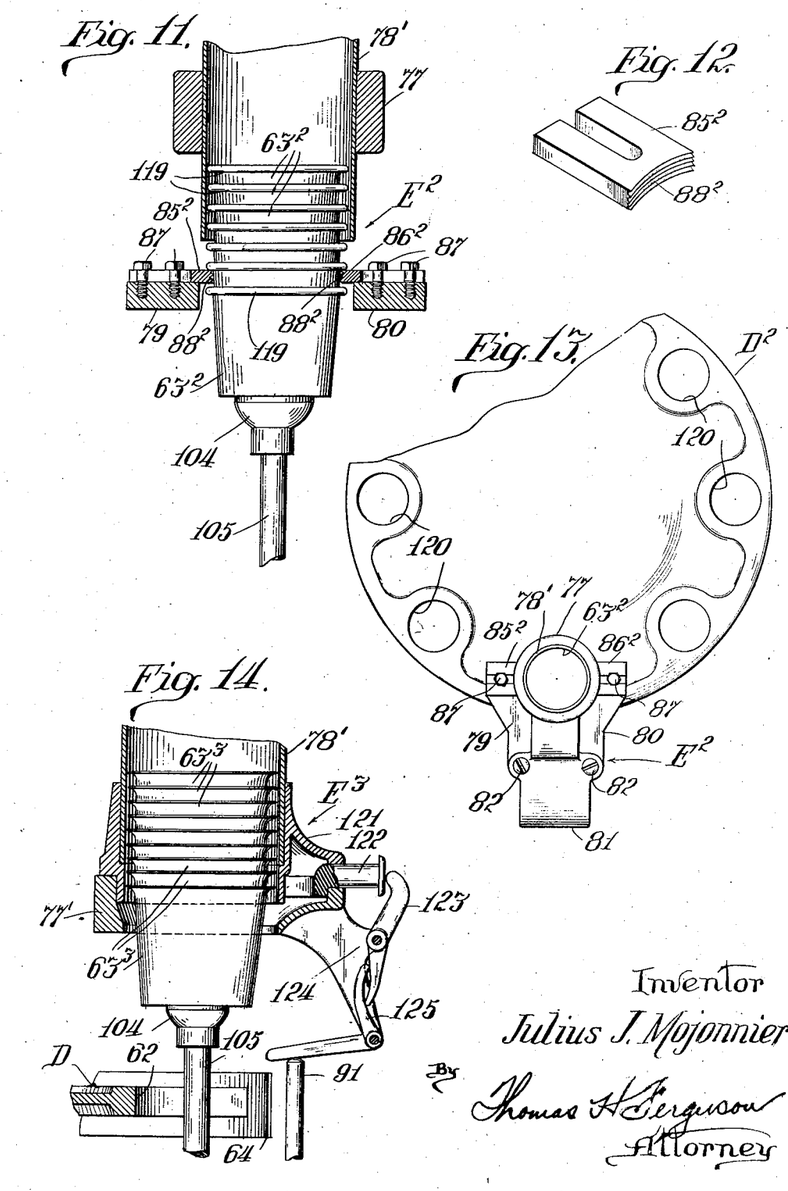
Fig. 11 is a view similar to Fig. 9 of a further modification designed for handling cups with rims and provided with different clamping jaws.
Fig. 12 is a perspective view of one of the jaws employed in the structure of Fig. 11.
Fig. 13 is a plan view similar to Fig. 8 illustrating a modified carrier construction provided with circular openings for receiving the fed containers.
Fig. 14 is a sectional view similar to Fig. 11 illustrating a further modification of the feeder wherein the pneumatic cup is not part of the escapement mechanism but serves merely to convey or guide a delivered container. Throughout these views like characters refer to like parts.

Passing now to the feeder $E^2$, the same construction is employed as before except that again the jaws upon the clamping members 79 and 80 are different. Here the jaws $85^2$ and $86^2$ have curved engaging faces $88^2$ but the same are not angular in formation but extend only in one plane. This difference adapts the jaws to the feeding of containers $63^2$ which are circular in horizontal section but provided with rims 119. The edges of the jaws $85^2$ and $86^2$ readily pass between the rims 119 of adjacent cups and thus hold the stack in elevated position while leaving the lowermost cup free for delivery. If the lowermost cup sticks then the suction feature is employed. Otherwise it is not necessary, unless it is desired to increase the downward pull on the lowermost cup. The containers $63^2$ may be used upon the carrier $D^1$, or upon any other carrier suited to circular cups such as that illustrated in Fig. 13.

The carrier $D^2$, illustrated in Fig. 13, is one wherein the containers pass into circular openings 120 formed entirely in the body of the carrier. These are shaped for circular cups like those illustrated in Figs. 9 and 11. Obviously, the openings 120 might be differently shaped where cups of different horizontal outline were to be employed. In this instance the feeder $E^2$ is shown in association with the table $D^2$ although, of course, if cups like those of Fig. 9 were to be used, then feeder $E^1$ would be used in association with the table $D^2$.

In the various forms of the invention heretofore illustrated the member 104, which limits the downward movement of the stack, serves as one member of an escapement couple, where the other member is realized in the clamping jaws 79 and 80. It should be noted, however, that the member 104 upon the rod 105, whether the suction mechanism be employed or not, may be used as an accelerating or retarding member for the delivery of containers from a stack where the feeding of the containers is brought about independently of these members. Such an arrangement is illustrated in Fig. 14, where the feeder $E^3$ is employed in feeding cups $63^3$. In this instance the ring $77^1$ at the bottom of the holder $78^1$ has mechanism associated with it for the feeding of the cups one by one. This mechanism includes a casing 121 and a plunger 122. The parts for delivering the cups are more fully illustrated in Patent No. 1,260,432, dated March 26, 1918, and therefore need not be more fully disclosed herein; suffice it to say that each to and fro movement of the plunger 122 delivers one container $63^3$ from the bottom of the stack. In adapting this structure to the mechanism of Fig. 3, it is only necessary to actuate the plunger 122 from rod 91 to some lever mechanism such as the bell crank levers 123 and 125, pivoted to an extension 124 formed upon the casing 121. In operation, the suction feature may be employed or not as desired. If employed, it may be used to hasten the downward movement of the lowermost cup. If not employed, then the lowermost cup will simply be supported while passing downward into engagement with the space in the carrier D. In this instance the employment of the suction feature is not necessary in order to remove the bottom cup from the stack, because this is accomplished by the plunger mechanism fully disclosed in the aforesaid patent. The member 104 here merely serves to retard or accelerate or guide the downward movement of the cup.

It will be understood that in carrying out my invention certain other alterations and modifications may be made in the structure herein disclosed as the preferred embodiment of the invention without departing from its spirit and scope. In certain instances the pneumatic feeder might be used in conveying articles in a path other than one directly beneath the holder. Likewise, the articles distributed from the stack might be articles which were not nested as in the case of the containers and cups illustrated. If the feed is to include more than one article at a time, then obviously the spacing between the clamping jaws on the one hand and the limiting member 104 on the other would have to be increased over that illustrated. It is clear that the pneumatic cup, when the pneumatic feature is employed, conveys articles from the bottom of the stack in the holder to a delivery point. The delivery point is disclosed as in the carrier but obviously might be elsewhere in a different kind of machine. In other words the pneumatic feature might be employed without the carrier and still embody certain features of the invention. "Seriatim" is used to express the idea of delivery in order or series, not necessarily one at a time. The various openings 62, 62¹ and 120, the former cooperating with the guard 34 and the plate 60, constitute a series of article holders or retainers upon the carrier. Viewed a little differently, they are a series of article receiving positions upon the carrier.

What I claim as new and desire to secure by a patent of the United States is:

1. In combination, a holder for articles arranged in a stack, a vertically movable pneumatic cup for conveying articles from the bottom of the stack downward to a delivery point, said cup when in its uppermost position limiting the downward movement of the stack when said stack is otherwise free, clamping members for engaging the stack above the bottom article to support the stack thereabove when said pneumatic cup is moved from said limiting position, a vertically movable member for actuating said clamping members, means for operatively elevating and lowering said pneumatic cup and said member, means for actuating said elevating and lowering means and said clamping members in timed relation to feed articles from the bottom of the stack and convey them to the delivery point, and suction means cooperating with said cup in its seizing, conveying and delivering functions.

2. In combination, a holder for articles arranged in a stack, a vertically movable pneumatic cup operative to limit the downward movement of the stack when otherwise free, clamping members for engaging the stack above the bottom article to support the stack thereabove when said pneumatic cup is moved from said limiting position, a horizontally moving carrier for receiving said articles, step by step mechanism for advancing said carrier, a vertically movable auxiliary member for actuating said clamping members, means for operatively elevating and lowering said pneumatic cup and said member, means for actuating said step by step mechanism, said elevating and lowering means and said auxiliary member in timed relation to feed articles from the bottom of the stack to said carrier, and suction means cooperating with said cup in its seizing, conveying and delivering of the articles.

3. In combination, a holder for paper cups nested right side up in a stack, a vertically movable member beneath said holder, means for moving said member upward to a position beneath the stack wherein it will limit the downward movement of the stack when said stack is otherwise free, a pair of clamping members movable horizontally into and out of clamping engagement with the outer upper portions of the paper cups in the stack, said members having cup engaging faces shaped to conform to the portions of the surfaces of the cups engaged by them and having a height sufficient to engage a plurality of cups at the same time, an auxiliary member movable with said vertically movable member and operative to move said clamping members to free the stack as said vertically movable member approaches its uppermost position, means for moving said clamping members into clamping position as said auxiliary member recedes upon the withdrawal of said vertically movable member from its uppermost position, the stack limiting position of said vertically movable member and the point of engagement of said clamping members with the stack being spaced to leave one cup free below said clamping members, and suction means associated with said vertically movable member to seize each freed cup and hold it during its withdrawal from said stack.

4. In combination, a holder for paper cups nested right side up in a stack, a vertically movable member beneath said holder, means for moving said member upward to a position beneath the stack wherein it will limit the downward movement of the stack when said stack is otherwise free, a pair of clamping members at the lower end of said holder for engaging cups in the stack, said members having clamping faces shaped to conform to the portions of the surfaces of the cups engaged by them and having a height sufficient to engage at least two of the cups at the same time, a spring for normally forcing the clamping faces of said members toward each other into clamping position, an auxiliary member movable with said vertically movable member and operative on its upward movement to force said clamping members apart to free the stack and on its downward movement to disengage said clamping members and thus leave them free to again engage the stack, the stack limiting position of said vertically movable member and the point of engagement of said clamping members with the stack being spaced to leave the cup to be freed below said clamping members, and suction means associated with said vertically movable member to seize each freed cup and hold it during its withdrawal from said stack.

5. In combination, a carrier having a series of openings, a fixed plate beneath the path of travel of said openings, means for intermittently advancing said carrier to bring said openings successively to a receiving point, a holder for a stack of containers located above said receiving point, said containers fitting into said openings and sliding over said plate as said carrier advances, and means for controlling the delivery of containers from the bottom of said stack to said openings including a member moving up and down in timed relation with said carrier-advancing means through an opening in said fixed plate and through said carrier openings one after the other as they present themselves at the receiving point.

6. In combination, a carrier having a series of openings, a fixed plate beneath the path of travel of said openings, means for intermittently advancing said carrier to bring said openings successively to a receiving point, a holder for a stack of containers located above said receiving point, said containers fitting into said openings and sliding over said plate as said carrier advances, and means for controlling the delivery of containers from the bottom of said stack to said openings including horizontally moving clamping members at the bottom of said holder for alternately holding and freeing the stack, a cooperating member movable up and down through an opening in said fixed plate at said receiving point and through said carrier openings as they present themselves at said point, said member operating in its elevated position to limit the downward movement of the stack when freed by said clamping members, and a vertical rod movable up and down with said cooperating member in a path beside said carrier and fixed plate to actuate said clamping members, the movements of said clamping members, cooperating member, rod and carrier being operative to deliver containers from the bottom of the stack to the carrier openings one by one as said carrier advances.

7. In combination, a holder for paper cups nested right side up in a stack, a vertically movable cup engaging member for controlling the downward movement of cups freed from the bottom of the stack, means for moving said cup engaging member upward to an engaging position in which it will limit the downward movement of the stack when said stack is otherwise free, clamping members for engaging the stack above the bottom cup to support the stack thereabove when said cup engaging member is moved from said limiting position, a vertically movable member actuated by said moving means to open said clamping members while said cup engaging member is passing through its said limiting position, mechanical means for closing said clamping members as said cup-engaging member passes out of said limiting position, and suction means cooperating with said vertically movable cup engaging member to seize each cup engaged by it and hold the same during its delivery travel.

8. In combination, a holder for articles arranged in a stack, a vertically movable article engaging member operative, when elevated, to limit the downward movement of the stack when the stack is otherwise free and, when descending, to control the downward movement of the articles freed from the stack bottom, clamping members for engaging the stack above the bottom article to support the stack thereabove when said article engaging member is descending, a horizontally moving carrier for receiving articles in recesses or openings through which said article engaging member passes, step by step mechanism for advancing said carrier, a vertically movable auxiliary member for actuating said clamping members, means for operatively elevating and lowering said article engaging member and said auxiliary clamp actuating member, and means for actuating said step by step mechanism, said elevating and lowering means and said auxiliary member in timed relation to feed articles seriatim from the bottom of the stack to said carrier.

9. In combination, a holder for articles arranged in a stack, means normally operative to sustain the stack by holding the lowermost article against delivery from said holder, a vertically movable member beneath said holder operative to control the downward movement of delivered articles, a second vertically movable member for positively actuating said sustaining means independently of the articles in said holder, means for elevating and lowering said members as a unit, said members being relatively positioned so that the upper end of the first will be in article receiving position when the upper end of the second actuates said sustaining means, and suction means for holding said delivered articles upon the upper end of said vertically movable member during its travel in a downward direction.

10. In combination, a holder for articles arranged in a stack, means normally operative to sustain the stack by holding the lowermost article against delivery from said holder, said sustaining means extending laterally beyond said holder and comprising two spring pressed clamping jaws movable in a plane perpendicular to the axis of said stack and having opposing projections adapted to abut against each other when said jaws are in clamping position, a member beneath said holder movable up and down along the axis of said holder to control the downward movement of delivered articles, a second member movable in a path parallel to that of said first member to wedge apart said opposing normally abutting projections to actuate said sustaining means by engaging the same outside of said holder, and means for elevating and lowering said members as a unit, said members being relatively positioned so that the upper end of the first will be in article receiving position when the upper end of the second actuates said sustaining means.

11. In combination, a holder for articles arranged in a stack, means normally operative to sustain the stack by holding the lowermost article against delivery from said holder, a vertically movable tubular member beneath said holder, a pneumatic cup on the upper end of said tubular member for engaging delivered articles to control their downward movement, a second vertically movable member for positively actuating said sustaining means independently of the articles in said holder, means for elevating and lowering said members as a unit, said members being relatively positioned so that said cup will be in article receiving position when the upper end of said second member actuates said sustaining means, suction producing means communicating with said tubular member, and suction control means operating in timed relation with the movements of said cup.

12. In combination, a holder for articles arranged in a stack, means normally operative to sustain the stack by holding the lowermost article against delivery from said holder, said sustaining means extending laterally beyond said holder, a tubular member beneath said holder movable up and down along the axis of said holder, a pneumatic cup on the upper end of said tubular member for engaging delivered articles to control their downward movement, a second member movable in a path parallel to that of said first member to actuate said sustaining means by engaging the same outside of said holder, means for elevating and lowering said members as a unit, said members being relatively positioned so that said cup will be in article receiving position when the upper end of said second member actuates said sustaining means, suction producing means communicating with said tubular member, and suction control means operating in timed relation with the movements of said cup.

13. In combination, a fixed plate upon which articles are to be deposited, means for advancing deposited articles along said plate, a tubular member movable up and down through an opening in said plate, a pneumatic cup on the upper end of said member, means for presenting articles seriatim to said cup above said plate, a suction connection to the lower end of said tubular member, a valve on said member controlling a passage to atmosphere from the interior of said member, and tripping means operative to momentarily open said valve only at the moment said cup passes downward through the opening in said plate.

14. In combination, a fixed plate upon which articles are to be deposited, means for advancing deposited articles along said plate, a tubular member movable up and down through an opening in said plate, a pneumatic cup on the upper end of said member, means for presenting articles seriatim to said cup above said plate, a suction connection to the lower end of said tubular member, a valve on said member controlling a passage to atmosphere from the interior of said member, a finger on said valve, and a cooperating trip finger adapted to be pushed out of the way by said valve finger as the latter rises but to engage said valve finger to momentarily open said valve at the moment said cup passes downward through the opening in said plate.

15. In combination, a holder for articles arranged in a stack, a vertically movable pneumatic cup for conveying articles from the bottom of the stack downward to a delivery point, means for moving said cup upward to a receiving position in which it will limit the downward movement of the stack when said stack is otherwise free, retaining means movable into article retaining and releasing positions in timed relation with the to and fro movements of said cup independently of the presence of articles in said holder, the cooperation of said retaining means and cup serving as an escapement mechanism to feed the articles, when present in said holder, seriatim from the stack bottom, and suction means cooperating with said cup in its conveying movements to seize, convey and deliver the articles.

16. In combination, a holder for articles arranged in a stack, a vertically movable tubular rod for controlling the downward movement of articles freed from the bottom of the stack, means for moving said tubular rod upward to an engaging position in which its upper end will limit the downward movement of the stack when said stack is otherwise free, additional article engaging means movable into article retaining and releasing positions in timed relation with the movements of said vertically movable rod independently of the presence of articles in said holder, the cooperation of said additional means and said vertically movable member serving as an escapement mechanism to feed the articles, when present in said holder, seriatim from the stack bottom, vacuum connections with the lower end of said tubular rod, an apertured yielding member at the upper end of said rod to closely fit the articles it engages, and mechanism for controlling the vacuum supplied to said rod.

17. In combination, a holder for articles arranged in a stack, a vertically movable pneumatic cup for conveying articles from the bottom of the stack to a delivery point, means for periodically moving said cup to and fro between its receiving and delivery points, said cup when in its receiving position serving as a stop to limit the downward movement of a liberated stack, means for periodically holding and releasing the stack in its downward step by step travel, means for positively actuating said holding and releasing means in timed relation with the movements of said cup independently of the presence of articles to be fed, whereby when articles are present they will be fed seriatim from the bottom of the stack, and suction means cooperating with said cup in its conveying movements to seize, convey and deliver the articles.

18. In combination, a holder for articles arranged in a stack, a vertically movable tubular rod for controlling the movement of articles delivered from the bottom of the stack, means for periodically moving said rod to and fro between a receiving position beneath said stack and a delivery point, said rod when in its receiving position serving as a stop to limit the downward fall of the liberated stack above it, means for engaging and disengaging said stack to periodically hold and release the same in its downward step by step travel, means for positively actuating said engaging and disengaging means in timed relation with the movements of said vertically movable member independently of the presence of articles to be fed, whereby when articles are present they will be fed seriatim from the bottom of the stack, vacuum connections with the lower end of said tubular rod, an apertured yielding member at its upper end to closely fit the articles it engages, and mechanism for controlling the vacuum supplied to said rod.

19. In combination, a holder for paper cups nested right side up in a stack, a conveying pneumatic cup operative in receiving position to engage the bottom of the lowermost cup in the stack to limit the stack's downward movements, means for periodically moving said pneumatic cup up into said receiving position and then down and away to a delivery point, retaining members for engaging the outer upper portions of the paper cups, means for actuating said members in timed relation with said pneumatic cup's movements to free paper cups seriatim for delivery by said pneumatic cup, and suction means cooperating with said pneumatic cup in its movements to seize, convey and deliver the paper cups.

20. In combination, a holder for paper cups nested right side up in a stack, a tubular conveying and stop member operative in receiving position to engage the bottom of the lowermost cup in the stack to limit the stack's downward movements, means for periodically moving said conveying and stop member up into said receiving position and down and away to a delivery point, retaining members for engaging the outer upper portions of the paper cups, means for actuating said retaining members in timed relation with the movements of said conveying and stop member to free paper cups seriatim for conveyance by said conveying and stop member to said delivery point, vacuum connections with said tubular member, a pneumatic cup thereon for engaging the paper cups, and means for regulating the application of vacuum in timed relation with the movements of said tubular member and other parts.

In witness whereof, I hereunto subscribe my name this 11th day of January, A. D. 1927.

JULIUS J. MOJONNIER.